Feb. 18, 1958  M. F. ANDERSON ET AL  2,824,271
SYNCHRONIZATION SYSTEM
Filed Oct. 5, 1956  3 Sheets-Sheet 1

INVENTORS
MELVIN F. ANDERSON
MAURICE J. FRANCO
BY Wade Koontz
ATTORNEY
James S. Shannon
AGENT Feb. 18, 1958 M. F. ANDERSON ET AL 2,824,271
SYNCHRONIZATION SYSTEM
Filed Oct. 5, 1956 3 Sheets-Sheet 2

INVENTORS
MELVIN F. ANDERSON
MAURICE BRANCO
BY
ATTORNEY
AGENT

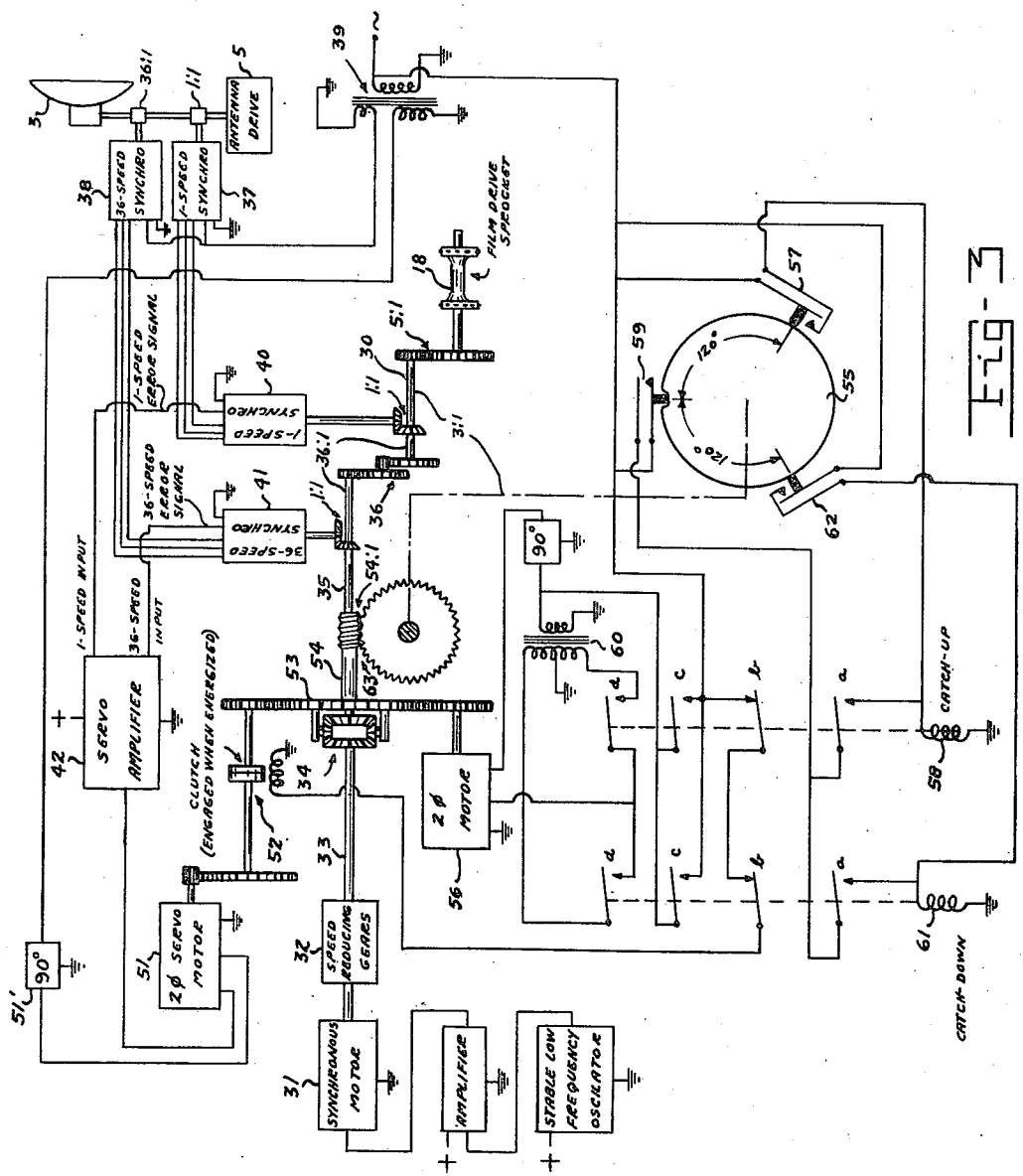

United States Patent Office 2,824,271
Patented Feb. 18, 1958

2,824,271

SYNCHRONIZATION SYSTEM

Melvin F. Anderson, Reseda, and Maurice Franco, Pacoima, Calif., assignors to the United States of America as represented by the Secretary of the Air Force Application October 5, 1956, Serial No. 614,330

3 Claims. (Cl. 318—85)

It is the object of this invention to provide means for modifying the speed of a first shaft from a normal constant value so as to synchronize its speed with that of a second shaft and at the same time to prevent the resulting accumulative error in the rotational distance travelled by the first shaft from exeeding predetermined limits.

Briefly, this is accomplished by driving the first shaft from two sources: one a constant speed source operating to drive the shaft at its constant normal speed, and the other a variable speed source the speed of which is determined by the phase difference between the two shafts. By means of a differential gear, the speed of the variable speed source is added to or subtracted from that of the constant speed source as required to maintain synchronism of the first shaft with respect to the second. This speed change of the first shaft results over a period of time in an accumulated error in the rotational distance travelled by the first shaft as compared with the distance it would have travelled had it been running at its normal speed. When the accumulated error reaches a predetermined amount, for example one revolution, a correction mechanism is triggered which acts through the differential gear to rapidly advance or retard the first shaft by one revolution to erase the accumulated error.

The invention will be described in more detail in connection with a specific application thereof to a radar signal simulator as shown in the drawings, in which:

Fig. 3 shows the film drive mechanism which incorporates the invention; and

Figure 1:
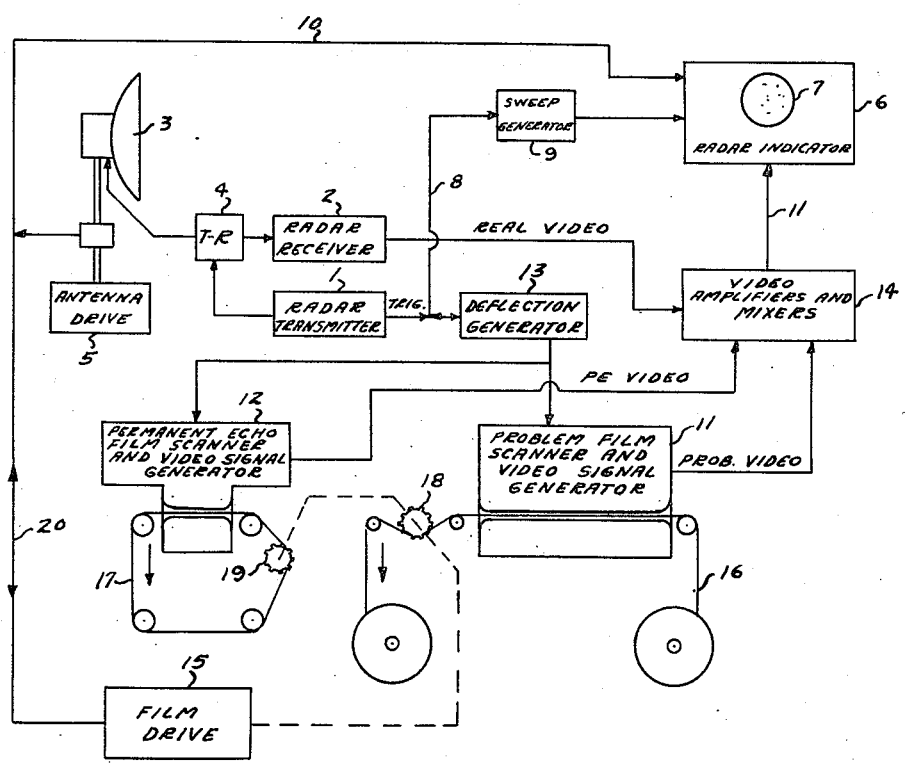
Fig. 1 is a block diagram of a ground radar station incorporating the radar signal simulator.

Fig. 1 shows in simple block form a ground radar station incorporating a radar signal simulator which operates to produce artificial targets on the radar indicator for training purposes. The station itself is conventional and contains a transmitter 1, a receiver 2, and an antenna 3 connected to the transmitter and receiver through a transmit-receive network 4. The antenna is rotated at constant speed by antenna drive 5. The indicator 6 may be of the P. P. I. (plan position indication) type in which each target appears on cathode-ray tube screen 7 as a spot of light whose distance from the center of the screen is proportional to range and whose angular position equals the target azimuth. As is well understood in the art, transmitter 1 supplies to antenna 3 a train of pulses of high frequency energy which are radiated in a narrow beam by the rotating antenna. Reflections of high frequency energy pulses from targets illuminated by the beam are received by the antenna and directed to the receiver which converts them into video pulses. These are applied to indicator 6 and serve to turn on the otherwise blanked beam of the cathode-ray tube. Trigger pulses coincident with the radiated pulses are supplied by transmitter 1 over connection 8 to sweep generator 9 which produces deflection voltages for the cathode-ray tube indicator causing one radial sweep of the beam from the center of screen 7 outward to be initiated at the time of each radiated pulse. A coupling 10 between the antenna and the indicator causes the direction of the sweep to rotate in synchronism with the rotating antenna.

The radar signal simulator associated with the above described radar station comprises problem film scanner and video signal generator 11 and associated problem film transport mechanism, permanent echo film scanner and video signal generator 12 and associated permanent echo film transport mechanism, deflection generator 13, video amplifiers and mixers 14 and film drive 15.

Figure 2:
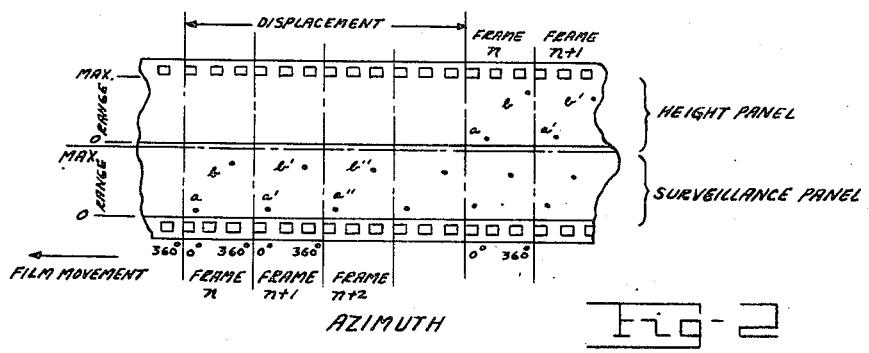
Fig. 2 shows the general arrangement of a problem film for use in the simulator.

The nature of problem film 16 is shown in Fig. 2. The film is opaque except for transparent dots (shown black in the drawing) representing targets. The film is divided longitudinally into a surveillance panel and a height panel and transversely into frames. Azimuth is measured longitudinally of the film, one frame representing 360° of antenna rotation. Range is measured transversely of the film. Two targets, designated $a$, $a'$, $a''$ . . . and $b$, $b'$, $b''$ . . ., are shown on the film in the surveillance panel. The film contains height information in the height panel. There is a displacement of corresponding surveillance and height frames along the film as shown because of the physical separation of the scanning heads for these panels in scanner 11. The targets in the height frames appear at the same ranges as the corresponding targets in the corresponding surveillance frames but at different azimuths, the difference in azimuth for any one target being proportional to the height of the target. Further details on height indication are omitted since this feature has no bearing on the invention.

The permanent echo film 17 is identical to problem film 16 except that the surveillance panel only is used. Since this film represents the permanent reflecting objects seen by the radar station each frame is the same, a sufficient number of frames being used to give a convenient size to the film loop.

Referring again to Fig. 1, films 16 and 17 are moved at constant speed through the scanners 11 and 12 by mechanically coupled sprockets 18 and 19, the former driven by film drive 15. While the films are moved longitudinally at constant speed they are caused to be linearly scanned in a transverse direction by flying spots of light controlled by sweep voltages applied to the scanners from deflection generator 13. When a scanning spot traverses a transparent spot on the film a pulse of light is admitted to a photocell located beneath the film which generates a video signal. When the permanent echo video signal and the problem video signal thus generated are applied to the indicator 6 through the video amplifiers and mixers 14, the indication on screen 7 simulates that occurring during actual operation of the station.

The signal simulator may be used under two conditions: (I) with the radar station inoperative, and (II) with the radar station operative to maintain surveillance. Under condition (I) deflection generator 13 supplies a trigger to sweep generator 9 to maintain synchronization between indicator and scanner sweeps, and film drive 15 supplies rotational information to the indicator to maintain synchronization in azimuth between the indicator and film 16. Under condition (II) the deflection generator 13 is synchronized by the same trigger that is supplied by the transmitter 1 to the sweep generator 9 so that the scanner and indicator sweeps operate in synchronism. Also film 16 must be synchronized with antenna 3, i. e. a 360° rotation of the antenna must advance film 16 (and 17) by exactly one frame. Therefore a synchronizing link 20 is indicated from the antenna toward the film drive 15.

The foregoing describes the apparatus at one ground station. A typical training problem involves all of the cooperating ground stations in a ground radar network. Therefore this apparatus is duplicated at each ground station involved. Each ground station is supplied with a permanent echo film 17 peculiar to the station and a problem film 16. Although the films 16 all relate to the same problem they are each different in their makeup because of the different geographical locations of the ground stations. In order for the instantaneous positions of a simulated target to be simultaneously observable at all ground stations it is obvious that close synchronization must be maintained between all of the films 16. In the case of operation condition (I), defined above, this is simple since it is only necessary to have an accurate clock motor in the film drives 15 for driving the film at constant speed. If the films are started at the same time they will remain in synchronization throughout the problem, which may last for several hours. For operation under condition (II), however, a difficulty arises in that in this case the films 16 are driven in synchronism with the ground station antennas and, since the speeds of theses antennas are not precisely controlled, synchronism errors between the films in the various stations can accumulate until large inaccuracies are produced in the simulated target indications. The invention, which is incorporated in the film drives 15, overcomes this difficulty and maintains synchronism between the films 16 within prescribed acceptable limits regardless of the speed differences of the antennas.

The details of film drive 15 are shown in Fig. 3. Referring to this figure, film drive sprocket 18 is driven from shaft 30 through a reduction gear such that one revolution of shaft 30 moves the film exactly one frame (Fig. 2). Therefore if shaft 30 is driven in exact rotational phase with antenna 3 the azimuth of the film and that of the antenna are always in agreement. Shaft 30 is driven by synchronous motor 31 through speed reducing gears 32, shaft 33, differential 34, shaft 35 and 36:1 reduction gearing 36. Gears 32 are selected so that the speed reduction between motor 31 and shaft 30 causes the shaft to rotate at the nominal rotational speed of the ground station antenna. The film speed corresponding to this speed of shaft 30 will be termed normal film speed. Motor 31 is energized by the amplified output of a stable low frequency oscillator. For example, this oscillator may be of the tuning fork type operating at 400 C./S. Due to the high frequency stability of the oscillator the speed of the synchronous motor is held to a constant value.

A 36-speed 1-speed synchro system is used to compare the phase of shaft 30 with that of the antenna. This system consists of 1-speed and 36-speed synchro generators 37 and 38 which are energized from transformer 39 and in turn energize 1-speed and 36-speed synchro control transformers 40 and 41. If shaft 30 is running in exact phase with antenna 3 the error signal outputs of these transformers and the 1-speed and 36-speed inputs to servo amplifier 42 are zero. Any tendency for the phase of shaft 30 to advance beyond or fall behind that of the antenna results in error signals at the outputs of the 1-speed and 36-speed control transformers. These signals are proportional in amplitude to the phase error and have one of two possible phases 180° apart depending upon the direction of the phase error. Due to the fact that the angular phase error is multiplied 36 times in the 36-speed system the error signal in this system builds up much faster than in the 1-speed system and, therefore, in actual operation, the 36-speed error signal is used to sense phase changes. There is, however, a 36 position ambiguity in the 36-speed system so that this system is effective only in a sector less than 10° wide. For phase errors greater than, for example, ±4° the 1-speed error signal is used. Selection of the proper error signal is made in the servo amplifier 42 on the basis of 1-speed error signal amplitude. A schematic diagram of this amplifier is shown in Fig. 4.

Figure 4:
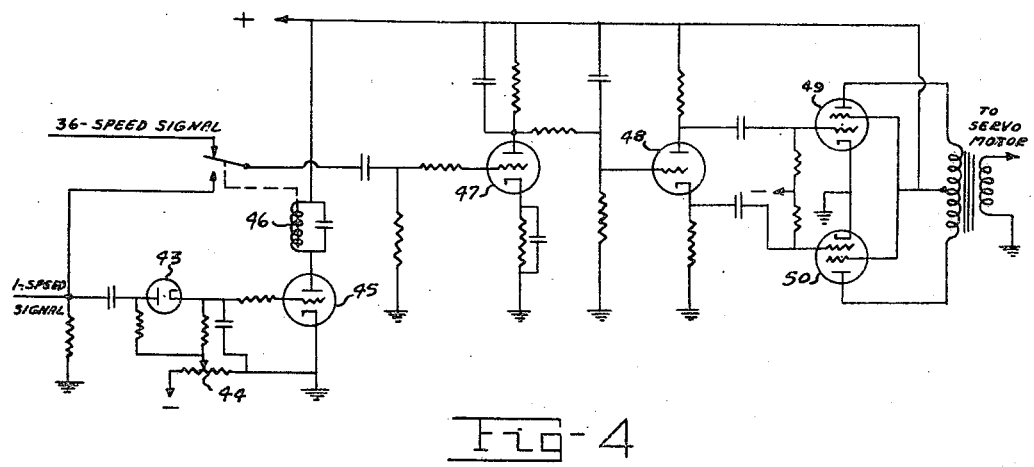
Fig. 4 is a circuit diagram of the servo amplifier in Fig. 3.

Referring to Fig. 4, the 1-speed error signal is rectified by diode 43 to produce a positive direct voltage which is applied in series with an adjustable negative voltage from potentiometer 44 between the grid and cathode of tube 45. Potentiometer 44 is so adjusted that relay 46 in the plate circuit of tube 45 is actuated when the 1-speed error signal reaches the amplitude corresponding to a shaft 30 phase error approaching but less than the ±5° phase error limit of the 36-speed signal. When relay 46 is actuated the 1-speed error signal replaces the 36-speed signal as an input to the servo amplifier. The remainder of the servo amplifier is conventional, 47 being a voltage amplifier stage, 48 a phase inverter stage and 49—50 being push-pull power amplifier stages.

Referring again to Fig. 3, the output of the servo amplifier 42 is utilized to energize one phase of two-phase servomotor 51, the other phase of which is permanently energized from transformer 39. Network 51' provides the required 90° difference between phases. A reversal in phase of the servo amplifier output, which occurs when the shaft 30 phase error changes sign, causes a reversal of the servomotor. The servomotor 51 is coupled through reduction gearing and clutch 52, which is engaged when energized, to the differential carrier gear 53. This gear is mounted on hub 54 which turns freely on shaft 35. When there is no rotational phase error between shaft 30 and the antenna there is no input to servo amplifier 42 and motor 51 does not run. Gear 53 is then stationary and shaft 35 turns at the speed of shaft 33 so that shaft 30 is driven at its normal speed. This condition exists when antenna 3 is turning at exactly the normal speed of shaft 30. If the speed of antenna is different from the normal speed of shaft 30 a rotational phase difference develops which results in an error signal at the input to servo amplifier 42. This causes servomotor 51 to turn gear 53 in such direction as to increase or decrease the speed of shaft 35 in the proper direction to cause the speed of shaft 30 to approach that of the antenna. A condition of equilibrium is reached when the speed of shaft 30 and the antenna are exactly equal and the rotational phase difference is just sufficient to provide the error signal necessary to maintain the equilibrium speed of motor 51. The greater the difference between antenna speed and the normal speed of shaft 30 the greater the equilibrium phase difference must be; however, it may be made as small as desired and of no practical importance by providing sufficient gain in the servo amplifier 42.

When, by the above process, shaft 30 is required to run at other than its normal speed in order to rotate at the same speed and in phase with the antenna, an error accumulates in the rotational distance travelled by the shaft. In the specific embodiment described, the maximum permissible accumulated error is set at one revolution of shaft 30, which is one frame of the film driven by sprocket 18. An error in film position of one frame can be tolerated because of the slight differences in target positions between adjacent frames. The net rotation of differential carrier gear is proportional to the accumulated error. Therefore the accumulated error may be measured by the rotation of cam 55 which is driven from gear 53 through worm drive 63. It is apparent from the gear ratios indicated in the drawing that one revolution of shaft 30 requires 36 revolutions of shaft 35 and 18 revolutions of gear 53, making the ratio of gear 53 to shaft 30 18:1. Therefore, with a worm drive ratio of 54:1, sufficient rotation of gear 53 to produce one revolution of shaft 30 will produce ⅓ revolution or 120° of rotation of cam 55. The direction of rotation of cam 55 indicates the direction of the error. For example, the mechanism may be arranged so that clockwise rotation of the cam indicates that the speed of shaft 30 is below its normal speed and the rotational distance travelled by the shaft is less than it should be, and counterclockwise rotation of the cam indicates the reverse situation in which the shaft speed and rotational distance travelled exceed the normal values.

When the accumulated error in shaft 30 reaches the limit of one revolution, as indicated by a ±120° rotation of cam 55, two-phase reversible motor 56 is energized and acts through gear 53 to rapidly add or subtract one revolution as required to erase the error. The process is as follows: Assume shaft 30 to be running at below-normal speed. Under this condition cam 55 rotates clockwise. When shaft 30 has fallen behind by one revolution the cam will have rotated through 120° closing switch 57 and energizing catch-up relay 58 which holds through switch 59, now closed, and contacts 58a. Actuation of relay 58 releases clutch 52 at contacts 58b, energizes transformer 60 and one phase of motor 56 at contacts 58c, and connects the other phase of motor 56 to one side of the transformer 60 secondary at contacts 58d. Motor 56 rotates gear 53 in the direction opposite to its previous rotation by servomotor 51 thereby erasing the accumulated error in shaft 30. As shaft 30 is advanced by motor 56, cam 55 rotates in the opposite (counterclockwise) direction. When the error is completely erased cam 55 will have returned to its neutral position opening switch 59 and releasing relay 58. This deenergizes motor 56 and reengages clutch 52 permitting synchronous operation between shaft 30 and antenna 3 to be resumed. When the accumulated error again amounts to one revolution the above process is repeated so that the accumulated error never exceeds this specified amount. Operation when the antenna speed exceeds the normal speed of shaft 30 is similar to the above except that in this case catch-down relay 61 is energized by switch 62 and motor 56 is reversed by connecting it to the opposite end of the transformer 60 secondary. The speed of motor 56 and its gear ratio to carrier gear 53 are such that the rate of rotation of gear 53 by this motor is high relative to its rate of rotation by motor 51.

Obviously the amount of accumulated error at which correction is initiated may be set at any desired value by the positioning of switches 57 and 62 or by changing the gear ratio between cam 55 and gear 53. The one frame maximum error is merely a practical limit for the specific application of the invention described.

We claim:

1. In a synchronization system, a first shaft, means for driving said first shaft at constant speed, a second rotating shaft, a variable speed reversible motor, means coupling said motor to said first shaft for algebraically adding a speed proportional to said motor speed to the constant speed of said first shaft, means associated with said first and second shafts for producing an error signal when the rotational phase of the first shaft is different from that of the second shaft, said error signal indicating the direction of the phase difference, means responsive to said error signal for energizing said motor for rotation at such speed and in the proper direction to bring the speed of the first shaft into equality with that of the second shaft, means coupled to said motor for measuring the rotational distance travelled by said first shaft due to said motor, and means coupled to said first shaft and associated with said measuring means and operative when said measured rotational distance equals a predetermined value for rapidly rotating said first shaft through an equal and opposite distance.

2. In a synchronization system, a first shaft, a differential gear, means for driving the first shaft through said differential gear at constant speed, a second rotating shaft, a variable speed reversible motor, means coupling said motor to the differential gear carrier for algebraically adding a speed proportional to said motor speed to the constant speed of the first shaft, means associated with said first and second shafts for producing an error signal when the rotational phase of the first shaft is different from that of the second shaft, said error signal being indicative of the magnitude and direction of the phase difference, means responsive to said error signal for energizing said motor for rotation at such speed and in the proper direction to bring the speed of the first shaft into equality with that of the second shaft, means coupled to said differential carrier for measuring the rotational distance travelled by said first shaft due to said variable speed motor, a second reversible motor coupled to said differential carrier, and means associated with said measuring means and operative when said measured rotational distance equals a predetermined value for energizing said second motor for rapidly rotating said first shaft through said differential carrier through an equal and opposite distance.

3. Apparatus as claimed in claim 2 in which a clutch is situated between said variable speed motor and said differential carrier, and means for disengaging said clutch whenever said second motor is energized.

References Cited in the file of this patent
UNITED STATES PATENTS
2,795,747  Wellington et al. _____ June 11, 1957